United States Patent Office 2,825,053
Patented Feb. 25, 1958

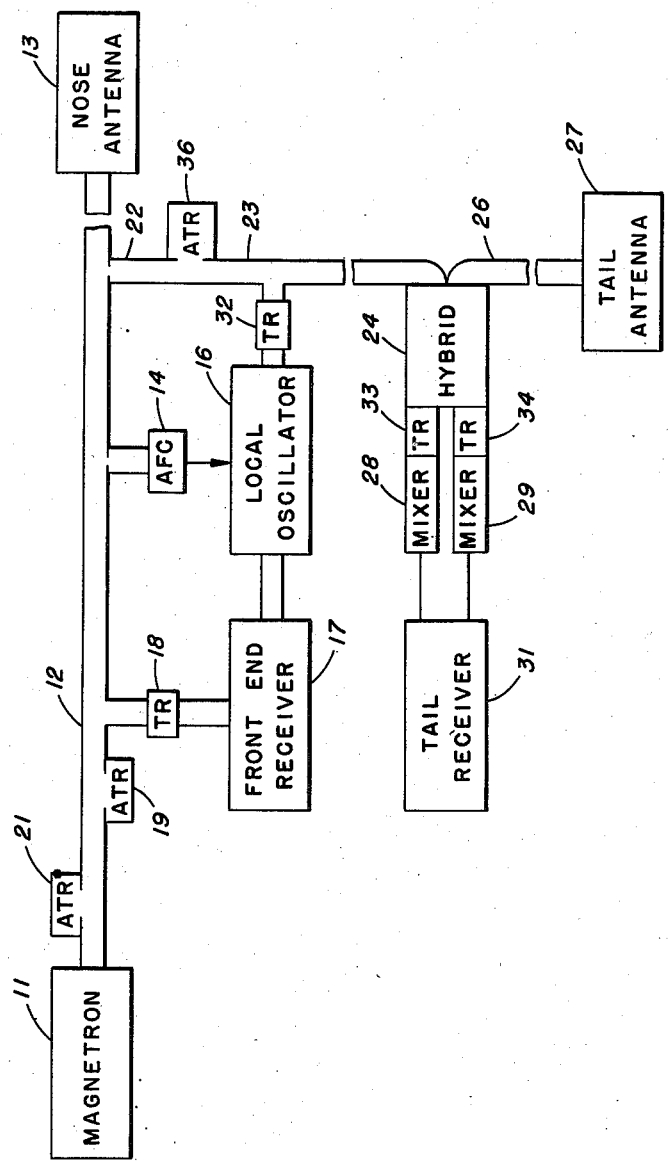
INVENTORS
EDWARD R. MITTELMAN
MYRON S. WHEELER
BY
ATTORNEYS

2,825,053

RADAR SYSTEM

Edward R. Mittelman and Myron S. Wheeler, Baltimore, Md., assignors, by mesne assignments, to the United States of America as represented by the Secretary of the Navy Application June 14, 1956, Serial No. 591,508

7 Claims. (Cl. 343—5)

The present invention relates to a radar system, and more particularly to a radar system in which a single transmitter section is utilized in conjunction with a plurality of receiver sections.

Prior airplane radar systems have utilized two complete radar systems, one of which energizes the nose antenna and the other of which energizes the tail antenna. The obvious disadvantages of these prior systems is in the duplication of equipment; i. e., two magnetrons, two local oscillator systems and two automatic frequency control systems are required, and this duplication of equipment is especially undesirable in aircraft installations where space and weight requirements are critical. In the present system, a single magnetron, local oscillator and automatic frequency control system, and circuitry are provided for coupling the output of the magnetron to both the nose antenna and the tail antenna (in the case of an airplane installation) and for connecting the output of the local oscillator into the front end receiver and tail receiver without interference between the two receiver sections. Thus, a plurality of receiver sections can operate independently of each other although they have a common transmitter section.

Accordingly, an object of the present invention is the provision of a radar system that has several receiver sections all of which operate in conjunction with a single transmitter section.

Another object is to provide an aircraft radar system for energizing a nose antenna and a tail antenna that utilizes a single magnetron system.

A further object of the invention is the provision of a tail warning radar system that utilizes the power output and local oscillator signal from a nose warning radar system.

Other objects and many of the attendant advantages of this invention will be readily appreciated as the same becomes better understood by reference to the following detailed description when considered in connection with the accompanying drawings wherein the figure shows a block diagram of a preferred embodiment of the invention.

Referring now to the drawing, there is shown in the figure (which illustrates a preferred embodiment) a conventional nose radar system for an airplane comprising a magnetron oscillator 11 for producing high frequency power that is guided along waveguide 12 to be propagated from nose antenna 13. An automatic frequency control system 14 detects shifts in frequency of the output from magnetron 11 and controls the frequency output of oscillator 16 to maintain the output of the mixer in the front end receiver 17 at a nearly constant intermediate frequency. A transmit receive device 18 is used to block the output from magnetron 11 from entering the front end receiver 17 and damaging the sensitive input stages. Anti-transmit receive devices 19 and 21, in combination with the impedance of the magnetron in its cold or off condition, present a high impedance to the received signals so that substantially all of the received signal is available to the input of receiver 17. In Patent No. 2,681,987 granted on June 22, 1954, to H. K. Farr, there is a discussion of the locations for anti-transmit receive and transmit receive devices to obtain optimum operation. Referring again to the figure, a one hole coupler 22 is placed in a wall of waveguide 12 to couple a predetermined fraction of the magnetron power into waveguide 23 of the tail warning radar system. This energy is connected through hybrid junction 24 and waveguide 26 to be propagated from tail antenna 27. The received signal from tail antenna 27 and the local oscillator signal from local oscillator 16 are fed in balanced form by means of hybrid junction 24 to mixers 28 and 29 which produce mixed signals for energizing the inputs to tail receiver 31. Transmit receive devices 32, 33 and 34 prevent the signal from magnetron 11 from entering, respectively, local oscillator 16, mixer 28 and mixer 29. Anti-transmit receive device 36 shorts coupling hole 22 so that none of the received signals from nose antenna 13 enters waveguide 23, and also provides a high impedance for the signal from local oscillator 16 thereby preventing the local oscillator signal from propagating along waveguide 23 towards one hole coupler 22. The positioning of the transmit receive devices 32, 33 and 34, and the anti-transmit receive device 36 are well-known in the art, and can be found, for example, in the above-mentioned patent to H. K. Farr. The system components of the present invention have been shown on the diagram in block component form inasmuch as all of the components are well-known in the art and there are many suitable devices for performing the operation of each component; however, there is one hybrid junction that is preferred, although it is to be realized that others could be employed, and that junction is the short-slot hybrid junction presented by Henry J. Riblet in the Proceedings of the Institute of Radio Engineers, volume 40, No. 2, pages 180-184.

In the operation of the present system, when magnetron 11 fires, anti-transmit receive devices 19 and 21 and transmit receive 18 ionize and the magnetron signal is guided down waveguide 12 to nose antenna 13. A predetermined fraction of this magnetron signal is coupled through one hole coupler 22 into waveguide 23 where it causes ionization of anti-transmit receive device 36 and transmit receive devices 32, 33 and 34 and a path is thus provided through waveguide 23, hybrid junction 24, waveguide 26 to tail antenna 27. The received signal detected by nose antenna 13 is guided down wave guide 12 to front end receiver 17. By the time signals are received, anti-transmit receive devices 19 and 21 and transmit receive device 18 have recovered and the anti-transmit receive devices prevent any of the received signal from going to magnetron 11 and, also, transmit receive device 18 provides a conducting path for the received signal to front end receiver 17 wherein the received signal is mixed with the signal from local oscillator 16 and processed to provide an indication. After the occurrence of the magnetron signal, anti-transmit receive device 36 recovers and presents a short at one hole coupler 22 thereby preventing any of the received signal from nose antenna 13 from entering waveguide 23. This anti-transmit receive device also presents a high impedance to the local oscillator signal 16 thereby preventing any of the local oscillator signal that is conducted through the recovered transmit receive device 32 from propagating towards one hole coupler 22 and instead all of this local oscillator signal goes towards hybrid junction 24. By the time a received signal is detected by antenna 27, transmit receive devices 33 and 34 have recovered and thus all of the power from antenna 27 and local oscillator 16 is received by mixers 28 and 29 wherein a balanced mixing operation is performed and the resulting signals are conducted to receiver 31 for providing an indication.

It is thus seen that a radar system has been provided for an airplane which produces nose warning and tail warning indications with the use of a single magnetron system to which a tail receiving device has been coupled. This system permits the nose warning radar systems and the tail warning radar systems to function without interference with each other, but yet requires only a single magnetron, automatic frequency control system and local oscillator system. The advantages of this system as regards space and weight requirements, cost and maintenance are obvious. Of course the present system is not limited to use in airplanes and the description of such a use has been presented only because it so saliently illustrates many of the advantages of the present invention.

Obviously many modifications and variations of the present invention are possible in the light of the above teachings. It is therefore to be understood that within the scope of the appended claims the invention may be practiced otherwise than as specifically described.

What is claimed is:

1. A radar system comprising: a magnetron for periodically generating a high frequency signal, a first antenna, a first waveguide for guiding said high frequency signal from said magnetron to said first antenna, a second waveguide, a one hole coupler for coupling a predetermined portion of said high frequency signal to said second waveguide, a hybrid junction having a first input connected to said second waveguide and having a second input and two normal outputs, a second antenna, a third waveguide joined between said second input to said hybrid junction and said second antenna, a first transmit receive device joined to one output of said hybrid junction and a second transmit receive device connected to the other output of said hybrid junction, a first mixer connected to said first transmit receive device, a second mixer connected to said second transmit receive device, a first receiver having two inputs one of which is connected to the output of said first mixer and the other of which is connected to the output of said second mixer, a second receiver, means connecting the input of said second receiver to said first waveguide for blocking the magnetron high frequency signal from and for passing the received signals from said first antenna to the input to said first receiver, means joined to said first waveguide near said magnetron for preventing any of the received signal from said first antenna from going to said magnetron but for not interfering with the conduction of the received signal from said first antenna to said second receiver, a local oscillator for generating a local oscillator signal, means for conducting the local oscillator signal from said local oscillator to said second receiver, means for conducting the local oscillator signal from said local oscillator into said second waveguide and for preventing any of the high frequency signal from said magnetron from entering said local oscillator, means connected to said second waveguide for preventing any of the received signal detected by said first antenna from entering said one hole coupler and for causing substantially all of the local oscillator signal fed into said second waveguide to be conducted to said first input of said hybrid junction, and an automatic frequency control system having an input connected to said first waveguide and an output connected to said local oscillator for detecting changes in the frequency of said high frequency signal from said magnetron and for controlling the local oscillator signal frequency such that the intermediate frequency in said first receiver and said second receiver stays substantially constant regardless of changes in said frequency in said high frequency signal.

2. A radar system comprising: a high frequency oscillator for producing a high frequency signal, a first antenna, a first waveguide for guiding said high frequency signal to said first antenna, a second waveguide, a one hole coupler for coupling a predetermined fraction of said high frequency signal to said second waveguide, a hybrid junction having a first input connected to said second waveguide and a second input and a first and second output for producing on said first output a signal comprising the signal on said first input and the signal on said second input shifted by 90° and for providing at said second output the signal fed to said second input and the signal fed to said first input shifted by 90° and for feeding the signal from said first input directly to said second input when said first and second outputs are shorted, a second antenna, a third waveguide connected between said second antenna and said second input of said hybrid coupler, a first receiver connected to said first waveguide for providing an indication of a received signal on said first antenna, a first mixer connected to said first output of said hybrid coupler, a second mixer connected to the second output of said hybrid coupler, a second receiver connected having two inputs one of which is connected to the output of said first mixer and the other of which is connected to the output of said second mixer, a local oscillator for producing a local oscillator signal, means for feeding said local oscillator signal to said first receiver and into said second waveguide, means connected to said second waveguide for preventing any of the local oscillator signal in said second waveguide from entering said first waveguide and for preventing any of the received signals from said first antenna from entering said second waveguide, and means connected to said first and second outputs of said hybrid coupler for shorting these outputs only during the transmission of a high frequency signal from said high frequency oscillator.

3. A radar system comprising: an oscillator for generating a high frequency signal, a first antenna, a first waveguide for guiding said high frequency signal from said oscillator to said first antenna, a second waveguide, power dividing means interconnecting said first waveguide and said second waveguide for coupling a predetermined fraction of said high frequency signal from said first waveguide into said second waveguide, a second antenna, a third waveguide having one end connected to said second antenna, a hybrid junction having a first input connected to said second waveguide and a second input connected to said third waveguide and having a first and a second output, a first transmit receive device connected to said first output of said hybrid junction, a second transmit receive device connected to the second output of said hybrid junction, a receiver system having two inputs one of which is connected to said first transmit receive device and the other of which is connected to said second transmit receive device, means for providing a local oscillator signal to said second waveguide, and means connected to said second waveguide for preventing any of the local oscillator signal from entering said first waveguide and for preventing any of the received signal from said first antenna from entering said second waveguide.

4. A radar system comprising: a first antenna, a second antenna, means for producing a high frequency signal, first means for conducting said high frequency signal to said first antenna, second means coupled to said first means for tapping off a predetermined portion of said high frequency signal, third means for coupling a signal to said second antenna, fourth means having two inputs for producing a balanced mixed signal from two input signals, fifth means for conducting said high frequency signal from said second means to said third means when said high frequency signal is being produced, a local oscillator for producing two output local oscillator signals, means for conducting one of said local oscillator signals to said fifth means except during the generation of the high frequency signal, sixth means joined to said first means and having an input fed by said other local oscillator signal for producing an indication of the signal received by said first antenna, seventh means for blocking said local oscillator signal in said second means from entering said first means and for blocking the received signal from said first antenna from entering said fifth means, eighth means connected to couple said local oscillator signal in said fifth means and the received signal on said second antenna shifted by 90° to one input of said fourth means and for connecting the recived signal on said second antenna and the local oscillator signal in said fifth means shifted by 90° to the other input of said fourth means, and ninth means connected to said fourth means to produce an indication of the balanced mixed signal.

5. An auxiliary radar system for use in conjunction with a main radar system having a local oscillator and a magnetron, said auxiliary radar system comprising a first waveguide having two ends, power dividing means connected to one end of said first waveguide for coupling a predetermined fraction of the signal produced by said magnetron in said main radar system to said first waveguide, an antenna, a second waveguide having one end connected to said antenna, a hybrid junction having a first input connected to the end of said first waveguide other than said one end and a second input connected to the end of said second waveguide other than said one end and having a first output and a second output for directly connecting said first waveguide to said second waveguide when said first and second outputs are shorted and for connecting a signal in said first waveguide and a signal in said second waveguide shifted by 90° to said first output and for connecting a signal in said second waveguide and a signal in said first waveguide shifted 90° to said second output, means for coupling a local oscillator signal from said local oscillator into said first waveguide, a first transmit receive device connected to said first output of said hybrid junction, a second transmit receive device connected to the second output of said hybrid junction, a first mixer connected to said first transmit receive device, a second mixer connected to said second transmit receive device, and a receiver connected to produce an indication of the mixed signals from said first mixer and said second mixer.

6. An auxiliary radar system for use in conjunction with a main radar system having a magnetron and a local oscillator, said auxiliary radar system comprising: a first waveguide, power divider means for coupling a predetermined fraction of the signal generated by said magnetron into said first waveguide, means for coupling the local oscillator signal into said first waveguide only when said magnetron is not firing, means connected to said first waveguide for preventing any of the local oscillator signals in said first waveguide from entering said main radar system and for preventing any of the received signals in said main radar system from entering said first waveguide, an antenna, a second waveguide connected to said antenna, a radar receiver having an input, a balanced mixer having an output joined to the input of said radar receiver and having an input, and means for coupling said high frequency signal from said first waveguide directly to said second waveguide for transmission by said antenna and for coupling the local oscillator signal from said first waveguide and the received signal from said antenna from said second waveguide in balance form to the input to said balanced mixer.

7. An auxiliary radar system for use in conjunction with a main radar system having a magnetron and a local oscillator, said auxiliary radar system comprising: first means for conducting high frequency signals, power divider means for coupling a predetermined portion of the signal generated by said magnetron into said first means, second means for conducting high frequency signals, a radar antenna coupled to said second means, third means for coupling the local oscillator signal from said local oscillator into said first means and for preventing any of this local oscillator signal from entering said main radar system, a radar receiver, and fourth means for coupling the high frequency signal from said first means into said second means and for conducting the local oscillator signal in said first means and the received signal from said antenna from said second means in balanced form to said radar receiver.

References Cited in the file of this patent

UNITED STATES PATENTS

| | | |
|---|---|---|
| 2,580,389 | Anderson | Jan. 1, 1952 |
| 2,765,401 | Riblet | Oct. 2, 1956 |
| 2,790,073 | Curtis | Apr. 23, 1957 |